United States Patent
Pirri et al.

(10) Patent No.: US 10,435,518 B2
(45) Date of Patent: Oct. 8, 2019

(54) POLYMER POWDER COMPOSITION AND ITS METHOD OF PREPARATION

(71) Applicant: Arkema France, Colombes (FR)

(72) Inventors: Rosangela Pirri, Montardon (FR); Philippe Hajji, Chatillon d'Azergues (FR); Christiaan A. Schipper, Cheterbrook, PA (US)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 15/301,811

(22) PCT Filed: Apr. 7, 2015

(86) PCT No.: PCT/EP2015/057505
§ 371 (c)(1),
(2) Date: Oct. 4, 2016

(87) PCT Pub. No.: WO2015/155180
PCT Pub. Date: Oct. 15, 2015

(65) Prior Publication Data
US 2017/0174847 A1  Jun. 22, 2017

(30) Foreign Application Priority Data

Apr. 7, 2014 (FR) ..................... 14 53044

(51) Int. Cl.
| | | |
|---|---|---|
| *C08J 3/12* | (2006.01) | |
| *C08F 220/18* | (2006.01) | |
| *C08F 265/06* | (2006.01) | |
| *C08J 7/04* | (2006.01) | |
| *C08F 2/00* | (2006.01) | |

(52) U.S. Cl.
CPC ............ *C08J 3/126* (2013.01); *C08F 2/001* (2013.01); *C08F 220/18* (2013.01); *C08F 265/06* (2013.01); *C08J 7/047* (2013.01); *C08J 2307/02* (2013.01); *C08J 2433/08* (2013.01); *C08J 2433/12* (2013.01)

(58) Field of Classification Search
CPC ..... C08L 51/003; C08L 2207/53; C08J 3/126; C08F 265/06
See application file for complete search history.

(56) References Cited

U.S. PATENT DOCUMENTS

| | | |
|---|---|---|
| 3,925,510 A | 12/1975 | Ide et al. |
| 3,983,296 A | 9/1976 | Purvis et al. |
| 4,391,928 A * | 7/1983 | Herman ............... C08F 291/00 523/201 |
| 4,892,910 A | 1/1990 | Klesse et al. |
| 5,336,718 A * | 8/1994 | Niessner ............... C08F 285/00 525/309 |
| 6,043,293 A | 3/2000 | Belik et al. |
| 8,859,678 B2 | 10/2014 | Disson et al. |
| 2002/0013405 A1 | 1/2002 | Sakaguchi et al. |
| 2002/0072552 A1 | 6/2002 | Wills et al. |
| 2004/0039123 A1 | 2/2004 | Troy et al. |
| 2005/0049332 A1 | 3/2005 | Higuchi et al. |
| 2005/0250880 A1 | 11/2005 | Troy et al. |
| 2010/0004365 A1* | 1/2010 | Saliya ................ C08G 18/4063 524/197 |
| 2012/0142796 A1 | 6/2012 | Sato et al. |
| 2013/0052457 A1 | 2/2013 | Inui et al. |
| 2013/0323637 A1* | 12/2013 | Watanabe ............ G03G 9/0802 430/109.4 |

FOREIGN PATENT DOCUMENTS

JP 2008-056751 A 3/2008

* cited by examiner

*Primary Examiner* — Jeffrey C Mullis
(74) *Attorney, Agent, or Firm* — Lynn B. Morreale

(57) ABSTRACT

The present invention relates to a non dusty polymer powder composed of aggregated latex particles prepared by a multistage preparation process.

9 Claims, No Drawings

POLYMER POWDER COMPOSITION AND ITS METHOD OF PREPARATION

CROSS-REFERENCE TO RELATED APPLICATIONS

This application is a national stage application under 35 U.S.C. § 371 of PCT/EP2015/057505, filed Apr. 7, 2015 which claims benefit to application FR14.53044, filed Apr. 7, 2014.

FIELD OF THE INVENTION

The present invention relates to a non dusty polymer powder, its composition and its process of preparation.

In particular the present invention it relates to a non dusty polymer powder, said polymer powder is composed of aggregated latex particles and the process of preparation of said latex particles.

More particularly the present invention relates to a non dusty polymer powder, said polymer powder is composed of aggregated latex particles and said latex particles are prepared by a multistage polymerization process.

Technical Problem

Polymer powders comprising polymers with specific characteristic (such as polymer composition, glass transition temperature or specific molecular weight range for naming some characteristics) are widely used products, such as additives for various polymers in order to enhance the processing behaviour of these various polymers or plastic resin or to improve their performance.

Such additives or more specifically polymeric plastic additives include additives that are used to control the rheological characteristics of the plastic resins and, in turn, optimize the resin's processability and increase the resin's process efficiency (hereinafter such polymeric plastic additives are called "processing aids").

Usually these processing aids polymer powders are composed of grains of aggregated latex particles. The aggregation can be obtained by coagulation under stirring while mixing the polymer latex with an aqueous electrolyte solution or by spray drying the polymer latex.

However the manipulation and handling of these powders are disadvantageous due to the large fine particle content in view of security and health aspect.

The handling of powders is also difficult in view of bad flow ability of the powders.

The objective of the present invention is to propose a polymer powder composition which is non dusty.

An objective of the present invention is also to have a polymer powder composition with low fines content.

Another objective of the present invention is to avoid a too fine powder and to obtain a polymer powder with coarser particles.

An additional objective of the present invention is the adaption of the polymer powder composition of the polymer powder according to the monomer composition of the respective polymers, especially the monomer composition of the polymers of respective stages of a polymer powder obtained by a multistage process.

Still another objective of the present invention is a method for manufacturing a polymer powder composition which is non-dusty and is having low fines content.

Still an additional objective is having a process for preparing polymer powder composition of a multistage polymer which is non dusty, with a low fine content, and estimating the polymer composition and ratio of the respective stages according to the composition and the corresponding Tg of the polymer of the last stage.

BACKGROUND OF THE INVENTION

Prior Art

The document U.S. Pat. No. 4,892,910 discloses polymer powders of low fines content and a method for making the same by spray drying. Said powder is obtained aggregating polymer particles of an aqueous dispersion comprising at least two different emulsion polymers (A) and (B) particles. This has the disadvantage, that two different polymers have to be prepared separately, that have to be mixed in a certain ratio and that the two different polymer particles should be compatible which each other.

The document WO 2008/104701 describes processing aids which are (meth)acrylic copolymers. The copolymers are made by emulsion polymerization and are recovered as a dry powder by spray drying. The (meth) acrylic polymers are simple polymers not obtained by a multi step process.

The document US2012/0142796 discloses processability improver for foam molding and vinyl chloride resin composition containing the same. The processability improver is obtained by a multistage process for polymeric particles comprising two (meth)acrylic polymers of a different molecular weight. The process discloses a process with a first stage, the preparation of a (meth)acrylic polymer with a weight average molecular weight between 10 000 and 300 000 and the as a second stage, the preparation of a (meth) acrylic polymer with a weight average molecular weight between 2 000 000 and 7 000 000 in presence of the first stage.

The document US2005/0049332 discloses a process for producing powdery linear polymer having improved powder properties. The process is a two step coagulation process of a latex of a multilayer polymer. The multilayer polymer comprises a linear polymer with a glass transition temperature below 40° C. and another linear polymer with a higher glass transition temperature (hard polymer). For that coagulation process it is important that the hard polymer is the outermost layer or that at most 30 wt % of the polymer with glass transition temperature is present in the outermost layer, the remaining portion is an inner layer of the multilayer polymer.

The document US2005/0250880 discloses a polymeric composition having low glass transition temperature. The polymeric composition comprises a first polymeric stage having a glass transition of at most 20° C. and a second polymeric stage having a glass transition of at least 30° C. The polymeric compositions are isolated as powders, more specifically they are co-isolated them by adding other polymeric particles and then co-coagulate or co-spray dry the whole together.

The document EP1201692 discloses a process for preparing impact modifiers powders. The impact modifier powder has a rubbery fraction of greater than 90 wt % of a polymer and the rubbery polymer is having a Tg of less than 25° C.

BRIEF DESCRIPTION OF THE INVENTION

Surprisingly it has been found that a polymer composition in form of polymeric particles comprising at least one stage forming a layer (B) comprising a polymer (B1) having a glass transition temperature of at least 60° C. and at least one stage forming a layer (A) comprising a polymer (A1) having a glass transition temperature of less then 60° C., obtained by a multistage process characterized that the weight ratio r of the layer (A) in the composition comprising the two layers is at least 1 wt %, gives a non-dusty polymer powder with a low fine content.

Surprisingly it has also been found that a polymer composition in form of polymeric particles comprising at least one stage forming an inner layer (B) comprising a polymer (B1) having a glass transition temperature of at least 60° C. and at least one stage forming an outer layer (A) comprising a polymer (A1) having a glass transition temperature of less then 60° C., obtained by a multistage process characterized that the weight ratio r of the outer layer (A) in the composition comprising the two layers is at least 1 wt %, yields to a non-dusty polymer powder with a low fine content after agglomeration of the polymer particles for forming the polymer powder.

Surprisingly it has also been found that a method for manufacturing a polymer composition comprising the steps of a) polymerizing by emulsion polymerization of a monomer or monomer mixture ($B_m$) to obtain layer (B) comprising a polymer (B1) having a glass transition temperature of at least 60° C.

b) polymerizing by emulsion polymerization of a monomer or monomer mixture ($A_m$) to obtain one layer (A) comprising polymer (A1) having a glass transition temperature of less then 60° C. in presence of the polymer obtained in step a)

wherein the weight ratio r of the layer (A) in the composition comprising the two layers is at least 1 wt %, yields to a non-dusty polymer powder with a low fine content after agglomeration of the polymer particles for forming the polymer powder.

DETAILED DESCRIPTION OF THE INVENTION

According to a first aspect, the present invention relates to a polymer composition in form of polymeric particles comprising at least one stage forming a layer (B) comprising a polymer (B1) having a glass transition temperature of at least 60° C. and at least one stage forming a layer (A) comprising a polymer (A1) having a glass transition temperature of less then 60° C., obtained by a multistage process characterized that the weight ratio r of the layer (A) in the composition comprising the two layers is at least 1 wt %.

According to a second aspect, the present invention relates to a polymer composition in form of polymeric particles comprising at least one stage forming an inner layer (B) comprising a polymer (B1) having a glass transition temperature of at least 60° C. and at least one stage forming an outer layer (A) comprising a polymer (A1) having a glass transition temperature of less then 60° C., obtained by a multistage process characterized that the weight ratio r of the outer layer (A) in the composition comprising the two layers is at least 1 wt %.

In a third aspect the present invention relates to a method for manufacturing a polymer composition comprising the steps of a) polymerizing by emulsion polymerization of a monomer or monomer mixture ($B_m$) to obtain layer (B) comprising a polymer (B1) having a glass transition temperature of at least 60° C.

b) polymerizing by emulsion polymerization of a monomer or monomer mixture ($A_m$) to obtain one layer (A) comprising polymer (A1) having a glass transition temperature of less then 60° C. in presence of the polymer obtained in step a)

wherein the weight ratio r of the layer (A) in the composition comprising the two layers is at least 1 wt %.

By the term "polymer powder" as used is denoted a polymer comprising powder grain in the range of at least 1 micrometer (μm) obtained by agglomeration of primary polymer comprising particles in the nanometer range.

By the term "primary particle" as used is denoted a spherical polymer comprising particle in the nanometer range. Preferably the primary particle has a weight average particle size between 50 nm and 500 nm.

By the term "non-dusty" as used is understood that the polymer powder has a low fine content.

By the term "low fine content" as used is denoted that the polymer powder has a D10 value of the particle size that is above 10 μm.

By the term "particle size" as used is denoted the volume average diameter of a particle considered as spherical.

By the term "copolymer" as used is denoted that the polymer consists of at least two different monomers.

By "multistage polymer" as used is denoted a polymer formed in sequential fashion by a multi-stage polymerization process. Preferred is a multi-stage emulsion polymerization process in which the first polymer is a first-stage polymer and the second polymer is a second-stage polymer, i.e., the second polymer is formed by emulsion polymerization in the presence of the first emulsion polymer, with at least two stages that are different in composition.

By the term "(meth)acrylic" as used is denoted all kind of acrylic and methacrylic monomers.

By the term "(meth)acrylic polymer" as used is denoted that the (meth)acrylic polymer comprises essentially polymers comprising (meth)acrylic monomers that make up 50 wt % or more of the (meth)acrylic polymer.

With regard to the spherical polymer particle, which is the primary particle that makes up by agglomeration the polymer powder of the invention, it has a weight average particle size between 20 nm and 500 nm. Preferably the weight average particle size of the polymer is between 50 nm and 400 nm, more preferably between 75 nm and 350 nm and advantageously between 80 nm and 300 nm.

The polymer particle has a multilayer structure comprising at least one layer (A) comprising a polymer (A1) having a glass transition temperature below 60° C. and another layer (B) comprising a polymer (B1) having a glass transition temperature over 60° C. Preferably the polymer (A1) having a glass transition temperature below 60° C. in the layer (A) is the external layer of the polymer particle having the multilayer structure.

The polymer particle according to the invention is obtained by a multistage process such as two or three stages or more stages.

Preferably the polymer (A1) having a glass transition temperature below 60° C. in the layer (A) is made in the last stage of the multistage process. The polymer (A1) is having a glass transition temperature below 60° C. in the layer (A) forms the external layer or outer shell of the polymer particle having the multilayer structure.

There could be additional intermediate layers made by intermediate steps between the polymer (A1) having a glass transition temperature below 60° C. in the layer (A) and the layer (B) comprising a polymer (B1) having a glass transition temperature over 60° C.

The weight ratio r of the external layer (A) comprising polymer (A1) in the complete polymer particle is at least 1 wt % and preferably at least 2 wt %.

According to the invention the ratio r of the external layer (A) comprising polymer (A1) in the complete polymer particle has to be adapted based on the composition of the polymer (A1) and especially as a function of its glass transition temperature.

The weight ratio r in wt % of the external layer (A) comprising polymer (A1) in the complete polymer particle is defined by following formula (1):

$$r = be^{aT} + 1 + \frac{1}{363 - T} \quad (1)$$

wherein the variable T is the glass transition temperature Tg expressed in Kelvin of the polymer (A1) of the external layer (A) and the exponent a and the factor b are adjustable parameters.

For the minimal weight ratio r in wt % of the external layer (A) comprising polymer (A1) in the complete polymer particle the exponent a is at least 0.024 and factor b is at least 0.0053, preferably the exponent a is at least 0.0245 and factor b is at least 0.0054 and more preferably the exponent a is at least 0.025 and factor b is at least 0.0055.

Preferably for the maximal weight ratio r of the external layer (A) comprising polymer (A1) in the complete polymer particle the exponent a is at most 0.028 and factor b is at most 0.007, preferably the exponent a is at most 0.0275 and factor b is at most 0.0065 and more preferably the exponent a is at most 0.027 and factor b is at most 0.006.

Preferably the polymer (A1) according to the invention has a glass transition temperature Tg between 200 K and 333 K more preferably between 200 K and 320 K, advantageously between 200 K and 310 K, more advantageously between 200 K and 300 K and most advantageously between 200 k and 295 K.

The weight ratio r of the external layer (A) comprising polymer (A1) in the preferred Tg interval in the complete polymer particle fulfills formula 1.

More specifically the weight ratio r in wt % of the external layer (A) comprising polymer (A1) in the complete polymer particle for a Tg between 200 K and 333 K of the polymer (A1) is defined by following formula (2):

$$r = b_1 e^{a_1 T} \quad (2)$$

wherein the variable T is the glass transition temperature Tg expressed in Kelvin of the polymer (A1) of the external layer (A) and the exponent a1 and the factor b1 are adjustable parameters.

For the minimal weight ratio r in wt % of the external layer (A) comprising polymer (A1) in the complete polymer particle the exponent a1 is at least 0.0255 and the factor b1 is at least 0.0055, preferably the exponent a is at least 0.0257 and factor b is at least 0.0056 and more preferably the exponent a is at least 0.026 and factor b is at least 0.0057.

Preferably for the maximal weight ratio r of the external layer (A) comprising polymer (A1) in the complete polymer particle a1 is at most 0.028 and b1 is at most 0.007, preferably the exponent a is at most 0.0275 and factor b is at most 0.0065, more preferably the exponent a is at most 0.027 and factor b is at most 0.0065 and advantageously the exponent a is at most 0.0265 and factor b is at most 0.0065.

Preferably the weight ratio r of the external layer (A) comprising polymer (A1) in the complete polymer particle is at most 30%, more preferably at most 29% and advantageously at most 28%.

Preferably the polymer (A1) is present only in the external layer (A).

The glass transition temperature Tg can be estimated for example by dynamic methods as thermo mechanical analysis.

In the case of the present invention, in order to calculate the necessary quantity of the polymer (A1) according to equation (1), the monomers for forming the polymer (A1) can be polymerized alone, in order to obtain a sample of polymer (A1) for estimating and measuring its glass transition temperature Tg. If the glass transition temperature Tg of the polymer (A1) is already known the necessary quantity of polymer (A1) based on ratio r can be calculated according to equation (1).

The polymer powder of the invention is in form of particles. A polymer powder particle comprises agglomerated primary polymer particles made by multistage process.

With regard to the polymer powder of the invention, it has a volume median particle size D50 between 1 µm and 500 µm. Preferably the volume median particle size of the polymer powder is between 10 µm and 400 µm, more preferably between 15 µm and 350 µm and advantageously between 20 µm and 300 µm.

The D10 of the particle size distribution in volume is at least 7 µm and preferably 10 µm.

The D90 of the particle size distribution in volume is at most 500 µm and preferably 400 µm, more preferably at most 250 µm.

With regard to the polymer (A1), mention may be made of homopolymers and copolymers comprising monomers with double bonds and/or vinyl monomers.

Preferably the polymer (A1) is a (meth) acrylic polymer. A (meth) acrylic polymer according to the invention is a polymer comprising at least 50 wt % preferably at least 60 wt % and more preferably at least 70 wt % of monomers coming from acrylic or methacrylic monomers. The (meth) acrylic polymer according to the invention comprise less than 50 wt % preferably less than 40 wt % and more preferably less than 30 wt % of non acrylic or methacrylic monomers, which can copolymerize with the acrylic or methacrylic monomers.

More preferably the polymer (A1) comprises at least 70 wt % monomers chosen from C1 to C12 alkyl (meth) acrylates. Still more preferably the polymer (A1) comprises at least 80 wt % of monomers C1 to C4 alkyl methacrylate and/or C1 to C8 alkyl acrylate monomers.

Most preferably the acrylic or methacrylic monomers of the polymer (A1) are chosen from methyl acrylate, ethyl acrylate, propyl acrylate, isopropyl acrylate, butyl acrylate, tert-butyl acrylate, methyl methacrylate, ethyl methacrylate, butyl methacrylate and mixtures thereof, as long as polymer (A1) is having a glass transition temperature of less then 60° C.

More preferably the glass transition temperature Tg of the polymer (A1) is between −50° C. and 50° C., even more preferably between −40° C. and 30° C. and advantageously between −30° C. and 30° C.

Preferably the mass average molecular weight Mw of the polymer (A1) is less than 1 000 000 g/mol, more preferably less than 500 000 g/mol and most preferably less than 300 000 g/mol.

With regard to the polymer (B1), mention may be made of homopolymers and copolymers comprising monomers with double bonds and/or vinyl monomers. Preferably the polymer (B1) is also a (meth) acrylic polymer.

Preferably the polymer (B1) comprises at least 70 wt % monomers chosen from C1 to C12 alkyl (meth)acrylates. Still more preferably the polymer (B1) comprises at least 80 wt % of monomers C1 to C4 alkyl methacrylate and/or C1 to C8 alkyl acrylate monomers.

Most preferably the acrylic or methacrylic monomers of the polymer (B1) are chosen from methyl acrylate, ethyl acrylate, butyl acrylate, methyl methacrylate, ethyl methacrylate, butyl methacrylate and mixtures thereof, as long as polymer (B1) is having a glass transition temperature of at least 60° C.

Advantageously the polymer (B1) comprises at least 70 wt % of monomer units coming from methyl methacrylate.

Preferably the glass transition temperature Tg of the polymer (B1) is between 60° C. and 150° C. The glass transition temperature of the polymer (B1) is more preferably between 80° C. and 150° C., advantageously between 90° C. and 150° C. and more advantageously between 100° C. and 150° C.

Preferably the mass average molecular weight of the polymer (B1) is at least 300 000 g/mol, preferably at least 500 000 g/mol, more preferably at least 750 000 g/mol, advantageously at least 1 000 000 g/mol and most advantageously at least 1 500 000 g/mol.

In the case of the present invention, in order to measure the mass average molecular weight Mw of the polymer (B1) alone, the monomers for forming the polymer (B1) can be polymerized alone, in order to obtain a sample of polymer (B1). The same applies for the polymer (A1).

With regard to the method for manufacturing the polymer composition according to the invention is comprises the steps of
 a) polymerizing by emulsion polymerization of a monomer or monomer mixture ($B_m$) to obtain layer (B) comprising a polymer (B1) having a glass transition temperature of at least 60° C.
 b) polymerizing by emulsion polymerization of a monomer or monomer mixture ($A_m$) to obtain one layer (A) comprising polymer (A1) having a glass transition temperature of less then 60° C.
wherein the weight ratio r of the obtained layer (A) in the composition comprising the two layers is at least 1 wt % preferably at least 2 wt %.

Preferably the step a) is made before step b). More preferably step b) is performed in presence of the polymer (B) obtained in step a).

Advantageously the method for manufacturing the polymer composition according to the invention is a multistep process comprises the steps one after the other of
 a) polymerizing by emulsion polymerization of a monomer or monomer mixture ($B_m$) to obtain layer (B) comprising a polymer (B1) having a glass transition temperature of at least 60° C.
 b) polymerizing by emulsion polymerization of a monomer or monomer mixture ($A_m$) to obtain one layer (A) comprising polymer (A1) having a glass transition temperature of less then 60° C. in presence of the polymer obtained in step a)
wherein the weight ratio r of the obtained layer (A) in the composition comprising the two layers is at least 1 wt % preferably at least 2 wt %.

The respective monomers or monomer mixtures ($A_m$) and ($B_m$) for forming the layers (A) and (B) respectively comprising the polymers (A1) and (B1) respectively and the characteristics of the respective polymers (A1) and (B1) are the same as defined before.

The weight ratio r in wt % of the layer (A) comprising polymer (A1) made by the manufacturing method in view of the complete polymer composition is defined by following formula (3):

$$r = be^{aT} + 1 + \frac{1}{363-T} \qquad (3)$$

wherein the variable T is the glass transition temperature Tg expressed in Kelvin of the polymer (A1) of the external layer (A) and the exponent a and the factor b are parameters.

For the minimal weight ratio r in wt % of the external layer (A) comprising polymer (A1) in the complete polymer particle the exponent a is at least 0.024 and factor b is at least 0.0053, preferably the exponent a is at least 0.0245 and factor b is at least 0.0054 and more preferably the exponent a is at least 0.025 and factor b is at least 0.0055.

Preferably for the maximal weight ratio r of the external layer (A) comprising polymer (A1) in the complete polymer particle the exponent a is at most 0.028 and factor b is at most 0.007, preferably the exponent a is at most 0.0275 and factor b is at most 0.0065, more preferably the exponent a is at most 0.027 and factor b is at most 0.0065 and advantageously the exponent a is at most 0.0265 and factor b is at most 0.0065.

Preferably the weight ratio r of the external layer (A) comprising polymer (A1) in the complete polymer particle is at most 30 wt %, more preferably at most 29 wt % and advantageously at most 28 wt %.

More specifically the weight ratio r in wt % of the external layer (A) comprising polymer (A1) in the complete polymer particle made by the manufacturing method, for a Tg between 200 K and 340 K and preferably for a Tg between 200 K and 333 K, of the polymer (A1) is defined by following formula (4):

$$r = b_1 e^{a_1 T} \qquad (4)$$

wherein the variable T is the glass transition temperature Tg expressed in Kelvin of the polymer (A1) of the external layer (A) and the exponent a1 and the factor b1 are parameters.

For the minimal weight ratio r in wt % of the external layer (A) comprising polymer (A1) in the complete polymer particle the exponent a1 is at least 0.0255 and the factor b1 is at least 0.0055, preferably the exponent a is at least 0.0257 and factor b is at least 0.0056 and more preferably the exponent a is at least 0.026 and factor b is at least 0.0057.

Preferably for the maximal weight ratio r of the external layer (A) comprising polymer (A1) in the complete polymer particle a1 is at most 0.028 and b1 is at most 0.007, preferably the exponent a is at most 0.0275 and factor b is at most 0.0065, more preferably the exponent a is at most 0.027 and factor b is at most 0.0065 and advantageously the exponent a is at most 0.0265 and factor b is at most 0.0065.

Preferably the weight ratio r of the external layer (A) comprising polymer (A1) in the complete polymer particle is at most 30 wt %, more preferably at most 29 wt % and advantageously at most 28 wt %.

Preferably the polymer (A1) is present only in the external layer (A).

The method may optionally comprise an additional step c) for recovering the polymer composition. The recovering is made by coagulation or by spray drying.

Coagulation is made by aggregation of the primary polymer particles at the end of the emulsion polymerization by adding an aqueous electrolyte solution under stirring.

Spray drying is the preferred method for the recovering and/or drying for the manufacturing method for a polymer powder composition according to the present invention.

The present invention relates also to the use of the polymeric powder composition according to the invention as processing aid in thermoplastic polymers.

A process aid is added to the thermoplastic material in order to avoid problems during the processing or to ease the processing of these thermoplastic polymers and when melt processed avoid undesirable defects in the finished shape made of the thermoplastic polymer.

[Methods of Evaluation]

Glass Transition Temperature

The glass transitions (Tg) of the polymers are measured with equipment able to realize a thermo mechanical analysis. A RDAII "RHEOMETRICS DYNAMIC ANALYSER" proposed by the Rheometrics Company has been used. The thermo mechanical analysis measures precisely the viscoelastics changes of a sample in function of the temperature, the strain or the deformation applied. The used frequency is 1 Hz. The apparatus records continuously, the sample deformation, keeping the stain fixed, during a controlled program of temperature variation.

The results are obtained by drawing, in function of the temperature, the elastic modulus (G'), the loss modulus and the tan delta. The Tg is higher temperature value read in the tan delta curve, when the derived of tan delta is equal to zero.

Molecular Weight

The mass average molecular weight (Mw) of the polymers is measured with by size exclusion chromatography (SEC).

Particle Size Analysis

The particle size of the primary particles after the multistage polymerization is measured with a Zetasizer Nano S90 from MALVERN.

The particle size of the polymer powder is measured with Malvern Mastersizer 3000 from MALVERN.

For the estimation of weight average powder particle size, particle size distribution and ratio of fine particles a Malvern Mastersizer 3000 apparatus with a 300 mm lenses, measuring a range from 0.5-880 μm is used.

D (v, 0.5) or more short D50 is the particle size at which 50% of the sample has size less then and 50% of the sample have a size larger then that size, or in other words the equivalent volume diameter at 50% cumulative volume. This size is also known as volume median diameter that is related to the mass median diameter by the density of the particles assuming a size independent density for the particles.

D (v, 0.1) or D10 is the particle size at which 10% of the sample is smaller then that size, or in other words the equivalent volume diameter at 10% cumulative volume.

D (v, 0.9) or D90 is the particle size at which 90% of the sample are smaller then that size.

EXAMPLES

Abbreviations

MMA—methyl methacrylate
BA—butyl acrylate
EA—ethyl acrylate

The comparative examples 1 and 2 are made according to the synthesis described in WO2008/104701.

Comparative Example 1

Charged into a reactor, with stirring, were 8500 g of water, 5.23 g of Na $CO_3$ and 78.20 g of sodium lauryl sulfate, and the mixture was stirred until complete dissolution. Three vacuum-nitrogen purges were carried out in succession and the reactor left under a slight vacuum. The reactor was then heated. At the same time, a mixture comprising 4175.2 g of methyl methacrylate, 260.95 g of styrene and 782.85 g of n-butyl acrylate was nitrogen-degassed for 30 minutes. Next, the mixture was rapidly introduced into the reactor using a pump. When the temperature of the reaction mixture reached 55 degrees centigrade, 7.8 g of potassium persulfate dissolved in 148 g of water were introduced. The line was rinsed with 50 g of water. The reaction mixture was left to rise in temperature to the exothermal peak. The polymerization was then left to completion for 60 minutes after the exothermal peak. The reactor was cooled down to 30° C. The polymer was then recovered, the latex being dried by spray drying.

Comparative Example 2

Charged into a reactor, with stirring, were 8600 g of water, 5.23 g of $Na_2CO_3$ and 38.20 g of sodium lauryl sulfate, and the mixture was stirred until complete dissolution. Three vacuum-nitrogen purges were carried out in succession and the reactor left under a slight vacuum. The reactor was then heated. At the same time, a mixture comprising 4427 g of methyl methacrylate and 781 g of n-butyl acrylate was nitrogen-degassed for 30 minutes. Next, the mixture was rapidly introduced into the reactor using a pump. When the temperature of the reaction mixture reached 55 degrees centigrade, 7.81 g of potassium persulfate dissolved in 98.08 g of water were introduced. The line was rinsed with 50 g of water. The reaction mixture was left to rise in temperature to the exothermal peak. The polymerization was then left to completion for 60 minutes after the exothermal peak. The reactor was cooled down to 30 degrees centigrade and the latex removed. The latex is dried by spray drying.

Comparative Example 3

Charged into a reactor, with stirring, were 8600 g of water, 5.23 g of $Na_2CO_3$ and 38.20 g of sodium lauryl sulfate, and the mixture was stirred until complete dissolution. Three vacuum-nitrogen purges were carried out in succession and the reactor left under a slight vacuum. The reactor was then heated. At the same time, a mixture comprising 4259.58 g of methyl methacrylate, 156.57 g of n-butyl acrylate and 782.85 g of ethyl acrylate was nitrogen-degassed for 30 minutes. Next, the mixture was rapidly introduced into the reactor using a pump. When the temperature of the reaction mixture reached 55 degrees centigrade, 7.81 g of potassium persulfate dissolved in 98.08 g of water were introduced. The line was rinsed with 50 g of water. The reaction mixture was left to rise in temperature to the exothermal peak. The polymerization was then left to completion for 60 minutes after the exothermal peak. The reactor was cooled down to 30 degrees centigrade and the latex removed. The latex is dried by spray drying.

Example 1

Particles with final stage forming outer layer (A) based on EA. A sufficient quantity of latex was prepared according to comparative example 1, but not spray dried. The starting material is the latex described in comparative example 1. The last step is polymerized in a 20 liters reactor. The reactor has been charged with 12000 g of latex with a solid content is 38%. Three vacuum-nitrogen purges were carried out in succession and the reactor left under a slight vacuum. The reactor was then heated at 80° C. At the same time, a mixture comprising 240 g of ethyl acrylate and 1.32 g of n octyl mercaptan was nitrogen-degassed for 30 minutes. Next, the mixture was rapidly introduced into the reactor using a pump. The line was rinsed with 100 g of water. When the temperature of the reaction mixture reached 80° C., 0.72 g of potassium persulfate dissolved in 50 g of water were introduced. The line was rinsed with 50 g of water. The reaction mixture was left to rise in temperature to a small exothermal peak. The polymerization was then left to completion for 60 minutes. Then 0.24 g of potassium persulfate dissolved in 50 g of water were introduced. The line was rinsed with 50 g of water. A holding period of 30 min was waited. The reactor was cooled down to 30° C. The polymer was then recovered, the latex being dried by spray drying. The results of the particle size distributions (PSD) obtained are given in the table 1, given by D10, D50 and D90 value respectively.

Example 2

Particles with final stage forming outer layer based on MMA/BA copolymer. The starting material is the latex described as in comparative example 1 made in sufficient quantity. The last step is polymerized in a 20 liters reactor. The reactor has been charged with 11368 g of latex having a solid content is 38%. Three vacuum-nitrogen purges were carried out in succession and the reactor left under a slight vacuum. The reactor was then heated at 80° C. At the same time, a mixture comprising 240 g of butyl acrylate, 240 g of methyl methacrylate and 2.64 g of n octyl mercaptan was nitrogen-degassed for 30 minutes. Next, the mixture was rapidly introduced into the reactor using a pump. The line was rinsed with 200 g of water. When the temperature of the reaction mixture reached 80° C., 1.44 g of potassium persulfate dissolved in 50 g of water were introduced. The line was rinsed with 50 g of water. The reaction mixture was left to rise in temperature to a small exotherm peak. The polymerization was then left to completion for 60 minutes. Then 0.48 g of potassium persulfate dissolved in 50 g of water were introduced. The line was rinsed with 50 g of water. A holding period of 30 min was waited. The reactor was cooled down to 30° C. The polymer was then recovered, the latex being dried by spray drying. The results of the particle size distributions (PSD) obtained are in the table 1, given by D10, D50 and D90 value respectively.

Examples 3 and 4 were made accordingly to example 1, while changing the latex starting material respectively to comparative examples 2 and 3.

The dried powders of all examples and comparative examples are analysed with Malvern Mastersizer 3000 to measure the particle size distribution and estimate the D10, D50 and D90 values respectively. Results are summarized in table 1.

TABLE 1

| Examples | Composition polymer (B1) in wt % | | | | Composition polymer (A1) in wt % | | | Tg (° C.) of (B1) Tg before last step | PSD [µm] | | |
|---|---|---|---|---|---|---|---|---|---|---|---|
| | MMA | Styrene | BA | EA | EA | BA | MMA | | D10 | D50 | D90 |
| Ex 1 | 80 | 5 | 15 | | 100 | | | 105 | 13 | 38 | 95 |
| Comp. Ex 1 | 80 | 5 | 15 | | | | | 105 | 6 | 19 | 45 |
| Ex. 2 | 80 | 5 | 15 | | | 50 | 50 | 105 | 14 | 40 | 87 |
| Ex. 3 | 85 | | 15 | | 100 | | | 102 | 10 | 26 | 56 |
| Comp. Ex 2 | 85 | | 15 | | | | | 102 | 5 | 14 | 40 |
| Ex. 4 | 82 | | 3 | 15 | 100 | | | 103 | 12 | 30 | 66 |
| Comp. Ex. 3 | 82 | | 3 | 15 | | | | 103 | 6 | 15 | 35 |

The comparative examples 1, 2 and 3 have a much smaller D10 value than the examples 1 to 4, which indicates a larger population of smaller particles or a larger fine content.

The invention claimed is:

1. A polymer composition in form of polymeric particles comprising
at least one stage forming a layer (B) comprising a polymer (B1) having a glass transition temperature between 80° C. and 150° C., and
at least one stage forming a layer (A) comprising a polymer (A1) having a glass transition temperature between −40° C. and 30° C.,
obtained by a multistage process wherein the weight ratio r of the layer (A) in the composition comprising the two layers is at least 1 wt %, and at most 30 wt %, wherein the layer (A) comprising a polymer (A1) having a glass transition temperature between −40° C. and 30° C. is a stage forming the outer layer of the polymeric particles and is present only in external layer (A),
wherein the layer (B) comprising polymer (B1) having a glass transition temperature of between 80° C. and 150° C. is a stage forming an inner layer of the polymeric particles,
wherein the mass average molecular weight Mw of polymer (A1) is less than 1,000,000 g/mol and the mass average molecular weight of polymer (B1) is at least 300,000 g/mol,
and wherein the weight ratio r in wt % of the layer (A) comprising polymer (A1) in a complete polymer particle is at least as defined by following formula $$r = be^{aT} + 1 + \frac{1}{363-T}$$

wherein the variable T is the glass transition temperature Tg expressed in Kelvin of the polymer (A1) of the layer (A) and the exponent a is at least 0.024 and factor b is at least 0.0053 and the exponent a is at most 0.028 and the factor b is at most 0.007.

2. The polymer composition according to claim 1 wherein the polymer (A1) is a (meth) acrylic polymer.

3. The polymer composition according to claim 1 wherein the polymer (A1) comprises at least 70 wt % monomers chosen from the group consisting of C1 to C12 alkyl (meth)acrylates.

4. The polymer composition according to claim 1 wherein the polymer (A1) comprises acrylic or methacrylic monomers that are chosen from the group consisting of methyl acrylate, ethyl acrylate, propyl acrylate, isopropyl acrylate, butyl acrylate, tert-butyl acrylate, methyl methacrylate, ethyl methacrylate, butyl methacrylate and mixtures thereof.

5. The polymer composition according to claim 1 wherein the polymer (B1) is a (meth) acrylic polymer.

6. The polymer composition according to claim 1 wherein the polymer (B1) comprises at least 70 wt % monomers chosen from the group consisting of C1 to C12 alkyl (meth)acrylates.

7. The polymer composition according to claim 1 wherein the polymer (B1) comprises acrylic or methacrylic monomers that are chosen from the group consisting of methyl acrylate, ethyl acrylate, butyl acrylate, methyl methacrylate, ethyl methacrylate, butyl methacrylate and mixtures thereof.

8. A method for manufacturing the polymer composition comprising the steps of:
a) polymerizing by emulsion polymerization of a monomer or monomer mixture ($B_m$) to obtain layer (B) comprising a polymer (B1) having a glass transition temperature of between 80° C. and 150° C.
b) polymerizing by emulsion polymerization of a monomer or monomer mixture ($A_m$) to obtain one layer (A) comprising polymer (A1) having a glass transition temperature of between −40° C. and 30° C., and
c) drying by spray drying to obtain polymer powder composition, wherein the weight ratio r of the obtained layer (A) in the composition comprising the two layers is at least 1 wt % and is at most 30 wt %, wherein the layer (A) comprising polymer A(1) having a glass transition temperature of between −40° C. and 30° C. is a stage forming the outer layer of the polymeric particles, wherein the layer (B) comprising polymer (B1) having a glass transition temperature of between 80° C. and 150° C. is a stage forming an inner layer of the polymeric particles, wherein the mass average molecular weight Mw of polymer (A1) is less than 1,000,000 g/mol and the mass average molecular weight of polymer (B1) is at least 300,000 g/mol, wherein the weight ratio r in wt % of the layer (A) comprising polymer (A1) in the complete polymer particle is at least as defined by following formula $$r = be^{aT} + 1 + \frac{1}{363-T}$$

wherein the variable T is the glass transition temperature Tg expressed in Kelvin of the polymer (A1) of the layer (A) and the exponent a is at least 0.024 and factor b is at least 0.0053, and wherein step a) is made before step b).

9. The method according to claim 8 wherein step b) is performed in presence of polymer (B) obtained in step a).

* * * * *